United States Patent Office 3,729,470
Patented Apr. 24, 1973

3,729,470
α-(3,5-DIMETHOXY)AMINOACETANILIDES
Madeleine Vaille, born Penciolelli, Brunoy, France, assignor to Orsymonde, Paris, France
No Drawing. Filed May 28, 1970, Ser. No. 41,637
Claims priority, application France, May 20, 1969, 6917560
Int. Cl. C07d 87/42
U.S. Cl. 260—247.2 A        2 Claims

ABSTRACT OF THE DISCLOSURE

The invention provides new phloramine derivatives of the formula

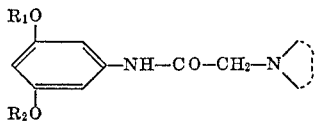

in which $R_1$ and $R_2$ are each hydrogen or lower alkyl, and

is an aminoaliphatic or heterocyclic radical, and their salts, which are useful as antispasmodics.

---

The present invention provides the new phloramine (or 3,5-dihydroxyaniline) derivatives of the formula:

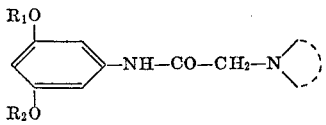  (I)

in which $R_1$ and $R_2$ are identical or different and each represent a hydrogen atom or a lower $C_1$–$C_3$ alkyl group, and

represents an aminoaliphatic or N-heterocyclic radical; and their acid addition salts.

The compounds of Formula I and their non-toxic acid addition salts can be used therapeutically. Pharmaceutical compositions which comprise, in association with a physiologically acceptable excipient, at least one compound of Formula I or one of its non-toxic acid addition salts have interesting properties, especially antispasmodic, choleretic and sedative properties.

The invention also provides a process for synthesising compounds of Formula I, which comprises condensing a chlorinated anilide of Formula II in an anhydrous hydrocarbon, preferably xylene, with an excess of an aliphatic or N-heterocyclic amine of Formula III, in accordance with the reaction:

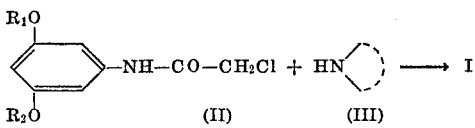

in which $R_1$, $R_2$ and

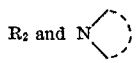

are as previously defined.

The use of a hydrocarbon as solvent permits the precipitation of the hydrochloride of Formula III which is formed, and consequently its easy elimination.

By non-toxic acid addition salts are to be understood the acid addition salts with mineral and organic acids currently used for therapeutical purposes. Suitable mineral acids are hydrochloric, hydrobromic, hydroiodic, sulphuric, nitric and phosphoric acids, and suitable organic acids are tartaric, citric, oxalic, maleic, fumaric, ascorbic, and cyclohexyl-sulphonic acids.

The amino-aliphatic radical

is a radical in which each of the groups attached to the nitrogen atom is a hydrogen atom or an alkyl group, e.g. amino, (lower alkyl)amino, or di(lower alkyl)amino. By N-heterocyclic radical is meant preferably a nitrogen-containing ring with 5, 6 or 7 ring atoms, capable of comprising a second heteroatom selected from nitrogen, oxygen and sulphur, Especially suitable are the following N-heterocyclic radicals: pyrrolidino, piperidino, azepino, piperazino, morpholino and thiomorpholino.

The following examples illustrate the invention.

EXAMPLE 1

14.6 g. (0.2 mol) of diethylamine are quickly added to 11.5 g. (0.05 mol) of α-(3,5-dimethoxy)chloracetanilide in 50 cc. of xylene, and the mixture is refluxed for 10 hours. After cooling, the diethylamine hydrochloride is filtered off, and washed with xylene. The xylene solution is extracted with twice 100 cc. of normal hydrochloric acid. 100 cc. of 2.5 N sodium hydroxide solution are added to the acid extracts and an oily base is precipitated. The latter is extracted twice with diethyl ether, and the ethereal extract is washed with water and dried. A solution of hydrogen chloride in diethyl ether is added to the dried ethereal solution with stirring, and the hydrochloride precipitates. It is recrystallised from a boiling mixture of 120 cc. of isopropanol and 30 cc. of ethanol, containing vegetable charcoal. 11.1 g. (75.7% yield) of α-(3,5-dimethoxy)diethylaminoacetanilide hydrochloride are obtained as white crystals, melting at 182° C. This compound is soluble in water, slightly soluble in ethanol and insoluble in the hydrocarbons.

EXAMPLE 2

The process described in Example 1 is followed, but replacing the diethylamine by 17.4 g. (0.2 mol) of morpholine. 10.8 g. of α-(3,5-dimethoxy)morpholinoacetanilide hydrochloride are obtained as white crystals (68.4% yield), melting between 180 and 183° C. after recrystallisation from a boiling mixture of 100 cc. of isopropanol and 100 cc. of ethanol containing vegetable charcoal. This hydrochloride is soluble in water and ethanol and insoluble in the hydrocarbons.

The pharmacological properties of products described above are as follows.

Product of Example 1

The toxicity of this compound, determined in the mouse and expressed as $LD_{50}$, is 99 mg./kg. when administered intravenously. With mice which have received doses of 50 mg./kg. by the intramuscular route, an increased excitation and excitability, particularly a medulla excitation to the Straub reaction, were observed.

This compound also has an antispasmodic action. On the isolated rat duodenum, in the dose of 50 μg./ml., it causes a slight relaxing of the organs at rest; with respect to barium chloride, the mean decontraction expressed as $ED_{50}$ is lower than 50 μg./ml.; with respect to acetyl choline, the $ED_{50}$ is in the region of 100 μg./ml.

On the isolated guinea pig ureter, the activity with respect to barium chloride is shown by a diminution of teh peristalsis of 30% on 4 organs and a stoppage on 4 others, in the dose of 100 μg./ml. The dose of 1 mg./ml. completely blocks peristalsis.

On the guinea pig ileum in situ, in the dose of 10 mg./kg. intravenously, the peristalsis index is reduced by 57%, and the product leads to a hypotension varying from 40 to 72%.

Administered intravenously in the dose of 10 mg./kg. to the anaesthetised rat, the product is hypercholeretic: the biliary rate of flow is increased by the maximum of 35% fror 30 minutes.

Furthermore, the product of Example 1 only exerts a very low antispasmodic activity on the ureter of an anaesthetised dog; injected intravenously, it has a bradycardic effect on the anaesthetised dog, the anaesthetised cat and the wakened rabbit; it is practically devoid of any peripheral vasodilatory action on the anaesthesised dog.

Product of Example 2

Pharmacological tests on this product showed an antispasmodic character with a highly sedative and choleretic action. Administered intravenously to the mouse, the toxicity expressed as $LD_{50}$ is 420 mg./kg. Mice, which had received intramuscular injections of a dose of 210 mg./kg., showed the following symptoms: sedation, diarrhoea, decrease in the respiratory rate, peripheral vasodilatation; with this dose, a transquillising and analgesic action was observed.

The antispasmodic action, studied on the isolated rat duodenum, is characterised by decontractions of 47% in the dose of 4 µg./ml. and 75% in the dose of 40 µg./ml., determined on organs contracted by barium chloride. With respect to the organs contracted by acetyl choline, the decontracture effect is 16% (at a dose of 4 µg./ml.), 32% (at a dose of 8 µg./ml.) and 95% (at a dose of 40 µg./ml.).

On the isolated guinea pig urether, a dose of 420 µg./ml. is inactive on the spontaneous contractions and reduces by 20% the activity of the barium. A dose of 840 µg./ml. reduces it by about 40%.

On the guinea pig ileum in situ, peristalsis of 3 animals out of three is stopped at a dose of 42 mg./kg. administered intravenously, and simultaneously a hypotension of 30 to 50% is observed.

On the anaesthetised dog at a dose of 42 mg./kg. given intravenously in the region of the sphincter of Oddi, the product has an antispasmodic intestinal effect for 10 to 30 minutes and a quickly appearing considerable oddian antispasmodic effect.

In the region of the uterus in situ of a rat in estrus, a dose of 42 mg./kg. injected intravenously reduces the spontaneous uterine peristalsis by 39% on average for 8 to 18 minutes.

Study of choleresis showed that the product causes, in the anaesthetised rat and at a dose of 42 mg./kg., a considerable hypercholeretic activity for more than 2 hours.

The local vasodilatory action, after injection by intraarterial route, is relatively considerable. The product is ten times less active than papaverine and the periods of action are comparable.

The product has a transquillising action: and potentiates sleep induced by chloral hydrate or by hexobarbital. In addition, in the mouse, the reduction in the spontaneous motility (63% after 15 minutes, 70% after 20 minutes) when administered intramuscularly at a dose of 105 mg./kg. is comparable to the effect of 300 mg./kg. of meprobamate administered intramuscularly.

The product is a dose of 84 mg./kg. intramuscularly in the mouse (that is to say at ⅕ of the $LD_{50}$ intravenously) has a sedative action, and an analgesic action of the aspirin type.

In a human being, α-(3,5-dimethoxy)morpholinoacetanilide hydrochloride is a powerful antispasmodic, especially in the treatment of biliary pains. It is very well tolerated.

The following formulations can advantageously be used:

|  | G. |
|---|---|
| α - (3,5 - dimethoxy)morpholinoacetanilide hydrochloride | 0.050 |
| Sodium chloride solution to 5 ml. for an ampoule. | |
| α - (3,5 - dimethoxy)morpholinoacetanilide hydrochloride | 0.10 |
| Excipient q.s. for one tablet. | |
| α - (3,5 - dimethoxy)morpholinoacetanilide hydrochloride | 0.10 |
| Lactose | 0.10 |
| for a capsule | |

I claim:

1. A compound selected from the group consisting of α - (3,5-dimethoxy)morpholinoacetanilide and the nontoxic acid addition salts thereof.

2. The hydrochloride salt of the compound of claim 1.

References Cited

Clark et al.: Chemical Abstracts, vol. 53, pp. 18024–26 (1959).

Clark, R. J., et al.: Brit J. Pharmacol, 13, 424–35 (1958).

ALEX MAZEL, Primary Examiner

JOSE TOVAR, Assistant Examiner

U.S. Cl. X.R.

260—239 BF, 243 B, 268 R, 293.77, 326.3, 562 N; 424—248